United States Patent
Gu et al.

(10) Patent No.: US 8,506,757 B2
(45) Date of Patent: Aug. 13, 2013

(54) HYDROPHOBICALLY MODIFIED POLY(AMINOAMIDES)

(75) Inventors: Qu-Ming Gu, Bear, DE (US); Lloyd A. Lobo, Lincoln University, PA (US); Erin A. S. Doherty, Hockessin, DE (US); Huai N. Cheng, Metairie, CA (US)

(73) Assignee: Hercules Incorporated, Wilmington, DE (US)

( * ) Notice: Subject to any disclaimer, the term of this patent is extended or adjusted under 35 U.S.C. 154(b) by 83 days.

(21) Appl. No.: 12/620,962

(22) Filed: Nov. 18, 2009

(65) Prior Publication Data

US 2010/0147476 A1 Jun. 17, 2010

Related U.S. Application Data

(60) Provisional application No. 61/115,766, filed on Nov. 18, 2008.

(51) Int. Cl.
*D21H 11/00* (2006.01)

(52) U.S. Cl.
USPC ............................................. 162/164.6

(58) Field of Classification Search
USPC ......... 528/335, 229, 327, 310, 332; 525/430; 162/111, 164.6; 524/606
See application file for complete search history.

(56) References Cited

U.S. PATENT DOCUMENTS

| | | | | |
|---|---|---|---|---|
| 3,582,461 | A | 6/1971 | Lipowski et al. | 162/72 |
| 3,893,885 | A | 7/1975 | Ziemann et al. | 162/164 |
| 3,988,280 | A | 10/1976 | Aldrich et al. | 260/29.2 |
| 3,992,345 | A | 11/1976 | Dumas | 260/29.7 |
| 4,250,299 | A | 2/1981 | Lehmann et al. | 528/342 |
| 4,407,994 | A | 10/1983 | Bankert et al. | 524/107 |
| 4,765,867 | A | 8/1988 | Dreisbach et al. | 162/72 |
| 4,871,424 | A | 10/1989 | Dreisbach et al. | 162/168.1 |
| 4,995,944 | A | 2/1991 | Aston et al. | 162/199 |
| 5,246,547 | A | 9/1993 | Finck et al. | 162/164.6 |
| 5,300,194 | A | 4/1994 | Welkener et al. | 162/199 |
| 5,393,380 | A | 2/1995 | Reed et al. | 162/168.2 |
| 5,885,419 | A | 3/1999 | Nguyen et al. | 162/174 |
| 6,183,521 | B1 | 2/2001 | Lin et al. | 8/139 |
| 6,222,006 | B1 * | 4/2001 | Kokko et al. | 528/332 |
| 6,352,613 | B1 * | 3/2002 | Maslanka | 162/111 |
| 6,517,682 | B2 | 2/2003 | Hendriks et al. | 162/199 |
| 6,527,915 | B2 | 3/2003 | Gu | 162/174 |
| 6,977,027 | B2 | 12/2005 | Sharma et al. | 162/181.6 |
| 2003/0153722 | A1 * | 8/2003 | Gu et al. | 528/310 |
| 2004/0198947 | A1 * | 10/2004 | Maslanka | 528/335 |

FOREIGN PATENT DOCUMENTS

| | | |
|---|---|---|
| CA | 1150914 | 8/1983 |
| WO | 03057760 | 7/2003 |

OTHER PUBLICATIONS

James M. Casey, "Pulp and Paper", vol. II, 2nd edition pp. 1094-1099.

* cited by examiner

*Primary Examiner* — Mark Halpern
(74) *Attorney, Agent, or Firm* — Michael J. Herman; Joanne Rossi; Shaorong Chen

(57) ABSTRACT

Disclosed herein are hydrophobically-modified poly(aminoamides) useful as fixative detackifiers for stickies and pitch control in papermaking processes. These polymers are prepared via modification of amine-containing water-soluble poly(aminoamides) with reactive functional group-containing hydrophobic compounds. In particular, poly(aminoamides) may be modified, under appropriate reaction conditions, with long chain alkyl glycidyl ether, AKD (alkyl ketene dimer), ASA (alkyl succinyl anhydride), or Quab (3-chloro-2-hydroxypropyl-N,N,N-dimethylalkyl ammonium chloride). These novel polymers are effective in inhibiting deposition of organic contaminants in pulp and papermaking systems.

11 Claims, No Drawings

HYDROPHOBICALLY MODIFIED POLY(AMINOAMIDES)

This application claims priority of U.S. Provisional Application No. 61/115,766 filed Nov. 18, 2008, the entire contents of which are herein incorporated by reference.

FIELD OF THE INVENTION

This invention relates to water-soluble poly(aminoamide)-based polymers having amine groups substituted with hydrophobic functional groups and which are useful as contaminant control agents for stickies and pitch reduction, and processes for making such polymers, and compositions comprising such polymers.

BACKGROUND OF THE INVENTION

Organic contaminants are a major problem in the pulp and paper-making industry. These contaminants accumulate during the paper-making process and deposit on both the process machinery and the final paper products. These deposits foul equipment, reduce the efficiency of the process, lower final product quality, and increase equipment maintenance costs including increased costs due to machine down-time, and reduce productivity. Increasingly, industry practice is to use closed mill water systems and recycled wood fiber, both of which increase the concentration of contaminants in the system.

Organic contaminants, such as hydrophobic pitch and stickies, can come from virgin or recycled pulp sources. The contaminants from virgin pulp include those naturally occurring tacky components of wood resins. Some hydrolyzed wood resins generate fatty acids that interact with the calcium present in water to form calcium soaps that are a main source of organic deposits. The contaminants from recycled pulp come from contaminants in recycled process water and from various sources in recycled wood pulp including, styrene-butadiene latex and poly(vinyl acetate) adhesives from paper-coatings, urethane-based adhesives, polyethylene from plastic film, and wax from hot melt adhesives. Hydrolyzed alkyl ketene dimer and alkenyl succinic anhydride may also cause deposits. Most tacky materials that form deposits are hydrophobic in nature and are either anionic or nonionic.

Dispersion and stabilization of tacky particles using dispersants is a common treatment technique used to remove contaminants in papermaking process. Dispersants such as talc, Kaolin clay, anionic dispersants, and nonionic poly(vinyl alcohol) are commonly used in the industry (U.S. Pat. No. 4,871,424). Surfactants, anionic polymers, and combinations of hydrophobic and anionic copolymers are also used extensively to prevent calcium soap deposits (James P. Casey, *Pulp and Paper*, Vol. II, 2nd Ed., pp. 1096-7). Earlier techniques used for the treatments of stickies included using organic solvents, such as propane, dioxins, chlorinated organic compounds, and supercritical carbon dioxide, to disperse and extract the stickies from wood pulp (U.S. Pat. No. 6,183,521).

Conventional dispersants may be ineffective in closed mill water systems because of contaminant build-up in the water requiring a process machine shutdown to clean the machinery and mill water. Cationic polymers and copolymers, alone or in combination, address this problem by fixing anionic contaminants onto pulp fibers. Various cationic polymers have been disclosed. For example, polydiallyl dimethylammonium chloride polymers (polyDADMAC) and copolymers are often used commercially. U.S. Pat. No. 5,393,380 discloses a poly(DADMAC) copolymer mixture of polydiallyl dimethylammonium chloride and 3-acrylamido-3-methylbutanoic acid used for contaminant control. Canadian Patent No. 1,150,914 discloses a group of cationic contaminant control polymers formed by reacting epichlorohydrin and dimethylamine.

Cationic polymers may be combined with other polymers or chemicals for the uses in papermaking process. U.S. Pat. Nos. 3,893,885 and 4,250,299 disclose a method of combining low molecular weight polyethyleneimine (PEI) with different cationic polymers for contaminant control. U.S. Pat. No. 5,300,194 discloses using PEI or quaternized cationic polymers together with an anionic polymer to control pitch or stickies deposits. U.S. Pat. Nos. 6,517,682 and 4,995,944 disclose methods for the deposit control using combinations of cationic polymers with one or more nonionic surfactants having a hydrophilic/lipophilic balance (HLB) of 11 to 14. Various other cationic polymers were disclosed for pitch deposition control, including dicyandiamide-formaldehyde (U.S. Pat. No. 3,582,461), quaternized polyamine ionene polymers (U.S. Pat. No. 4,765,867), and a copolymer composition of N,N-diallyl-N,N-dimethylammonium chloride with 3-acrylamido-3-methylbutanoic acid (U.S. Pat. No. 5,393,380). Some natural polymers can also be used for contaminant control. U.S. Pat. No. 5,885,419 discloses the use of blood-related proteins, such as albumin and globulins, for preventing pitch and stickies deposition.

Cationic polymers can be ineffective for removing hydrophobic nonionic stickies. Instead, a combination of cationic polymers and anionic surfactants or surface active compounds may be used. U.S. Pat. No. 6,977,027 discloses a stickies control additive for recycled pulp comprising talc particles treated with a tertiary or quaternary amine. U.S. Pat. No. 6,527,915 discloses a method for stickies control in papermaking process using a combination of surface active whey proteins and cationic polymers such as polydiallyl dimethylammonium.

Finally, single component chemicals, such as hydrophobically modified cationic polymers, may be used to control stickies. These polymers can fix anionic stickies and disperse nonionic hydrophobic stickies. U.S. Pat. No. 5,246,547 discloses a hydrophobic polyelectrolyte copolymer of polydiallyl dimethylammonium for contaminant control.

Poly(aminoamides) based cationic polymers are also known to the pulp and paper industry, but have not been used specifically to treat process water in papermaking to reduce or control contaminants. U.S. Pat. Nos. 4,407,994, 3,988,280, and 3,992,345 disclose water insoluble hydrophobically modified poly(aminoamides) polymers for paper sizing. These polymers cannot effective control contaminants in the pulp or in a papermaking process because the materials are not soluble or dispersible in water.

EMBODIMENTS OF THE INVENTION

An embodiment of the present invention is a cationic, water-soluble polymer comprising randomly distributed units of formula (I):

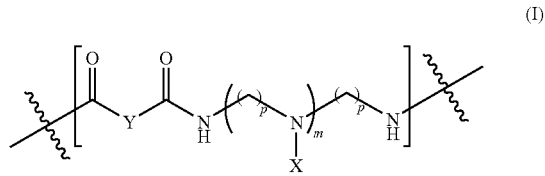

wherein X on said unit of formula (I) is a moiety selected from the group consisting of moieties of formulae (II), (III), (IV), (V), (VI), (VII), and (VIII):

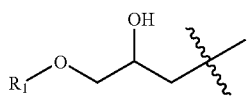
(II)

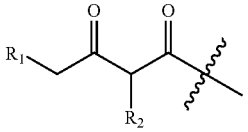
(III)

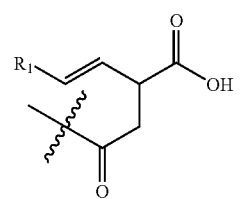
(IV)

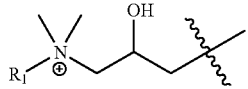
(V)

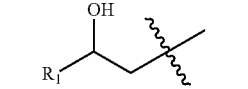
(VI)

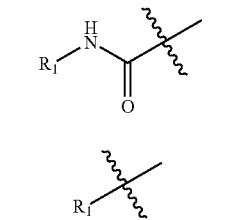
(VII)

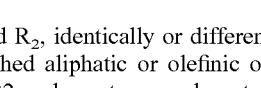
(VIII)

wherein $R_1$ and $R_2$, identically or differently, are a straight chain or branched aliphatic or olefinic or aromatic group having up to 22 carbon atoms and up to 4 double bonds, preferably having between 4 and 16 carbon atom; Y is a straight chain or branched aliphatic or olefinic group having up to 10 carbon atoms and up to 2 double bonds, and p and m are integers in the range of from 2 to 10. The number of randomly distributed units of formula (I) in the water-soluble, cationic polymer is represented by "n" and n is an integer in the range of from 5 to 10,000.

Another embodiment of the present invention is the a cationic water soluble polymer comprising randomly distributed units of formula (I) and formula (IX):

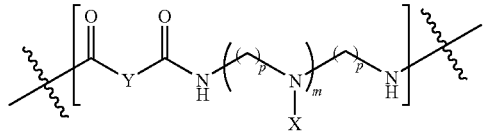
(I)

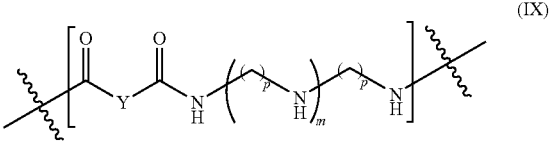
(IX)

wherein X on said unit of formula (I) is a moiety selected from the group consisting of moieties of formulae (II), (III), (IV), (V), (VI), (VII), and (VIII):

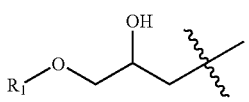
(II)

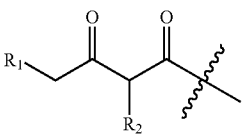
(III)

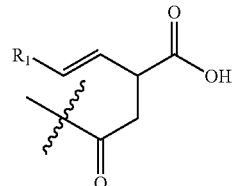
(IV)

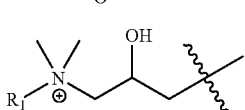
(V)

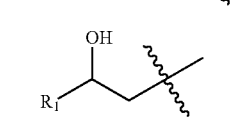
(VI)

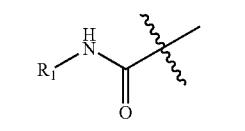
(VII)

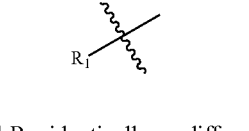
(VIII)

wherein $R_1$ and $R_2$, identically or differently, are a straight chain or branched aliphatic or olefinic or aromatic group having up to 22 carbon atoms and up to 4 double bonds, preferably having between 4 and 16 carbon atom; Y is a straight chain or branched aliphatic or olefinic or aromatic group having up to 20 carbon atoms and up to 8 double bonds, preferably having up to 10 carbon atoms and up to 2 double bonds; p and m are integers in the range of from 2 to 10. The number of randomly distributed units of formula (I) in the water-soluble, cationic polymer is represented by "n", which is an integer in the range of from 5 to 10,000. The number of randomly distributed units of formula (IX) in the water-soluble, cationic polymer is represented by "r", which is an integer in the range of from 5 to 10,000. The ratio of r:n is in the range of from 1:10 to 1000:1.

Another embodiment of the present invention is the above polymer, wherein Y is a straight chain $C_4$ alkyl group, p is 2, m is 1, the sum of n and r is in the range of from 50 to 5000, and the ratio of r:n is in the range from 10:1 to 100:1.

Another embodiment of the present invention is the above polymer, wherein the polymer comprises randomly distributed units of formula (I) wherein X on said units is a moiety of formula (II).

Another embodiment of the present invention is the above polymer, wherein the polymer comprises randomly distributed units of formula (I) wherein X on said units is a moiety of formula (III).

Another embodiment of the present invention is the above polymer, wherein the polymer comprises randomly distributed units of formula (I) wherein X on said units is a moiety of formula (IV).

Another embodiment of the present invention is the above polymer, wherein the polymer comprises randomly distributed units of formula (I) wherein X on said units is a moiety of formula (V).

Another embodiment of the present invention is the above polymer, wherein the polymer comprises randomly distributed units of formula (I) wherein X on said units is a moiety of formula (VI).

Another embodiment of the present invention is the above polymer, wherein the polymer comprises randomly distributed units of formula (I) wherein X on said units is a moiety of formula (VII).

Another embodiment of the present invention is the above polymer, wherein the polymer comprises randomly distributed units of formula (I) wherein X on said units is a moiety of formula (VIII).

Another embodiment of the present invention is the above polymer, wherein the polymer comprises randomly distributed units of formula (I) wherein X on said units is independently on each unit a moiety selected from the group consisting of formulae (II), (III), (IV), (V), (VI), (VII), and (VIII).

Another embodiment of the present invention is the above polymer wherein the molecular weight of said polymer is in the range of from about 1,000 to about 1,000,000 Daltons.

Another embodiment of the present invention is the above polymer wherein the molecular weight of said polymer is in the range of from about 4,000 to about 500,000 Daltons.

Another embodiment of the present invention is the above polymer wherein the molecular weight of said polymer is in the range of from about 8,000 to about 300,000 Daltons.

Yet another embodiment of the present invention is a process for preparing the above polymer, comprising reacting a diacid or a diester of formula (X):

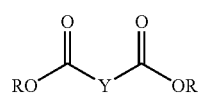

(X)

wherein Y is a straight chain or branched aliphatic or olefinic or aromatic group having up to 20 carbon atoms and up to 8 double bonds, preferably having up to 10 carbons atoms and up to 2 double bonds, and R is a hydrogen atom or an alkyl group;

with a diamine of formula (XI):

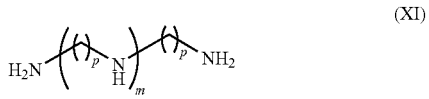

(XI)

wherein p and m are integers in the range of from 2 to 10 to form a poly(aminoamide) and reacting said poly(aminoamide) with at least one compound selected from the group consisting of alkylating agents, an acylating agents, and an alkyl isocyanates, wherein said alkylating agents, acylating agents, and alkyl isocyanates comprise a straight chain or branched aliphatic or olefinic group having up to 22 carbon atoms, up to 4 double bonds, and an amine-reactive functional group.

Another embodiment of the present invention is the above process, wherein said alkylating agent is selected from the group consisting of alkyl glycidyl ethers having 2 to 22 carbon atoms, alkylene oxides having 2 to 22 carbon atoms, alkyl halides having 2 to 22 carbon atoms, 3-chloro-2-hydroxypropyl-alkyl-dimethylammonium chlorides having 2 to 22 carbon atoms, and (dialkylamino)alkyl chlorides having 2 to 22 carbon atoms.

Another embodiment of the present invention is the above process, wherein said alkyl glycidyl ether having 2-22 carbon atoms is selected from the group consisting of butyl glycidyl ether, octyl glycidyl ether, 2-ethylhexyl glycidyl ether, dodecyl glycidyl ether, and hexadecyl glycidyl ether; said alkylene oxide having 2-22 carbon atoms is selected from the group consisting of propylene oxide, dibutyl-ethylene oxide, butylene oxide, octylene oxide, butadiene monoxide, cyclohexane epoxide, and hexyl-ethylene oxide, styrene oxide; said alkyl halide having 2-22 carbon atoms is selected from the group consisting of ethyl chloride, propyl chloride, butyl chloride, octyl chloride, dodecyl chloride, hexadecyl chloride, benzyl chloride, and phenylethyl chloride; said 3-chloro-2-hydroxypropyl-alkyl-dimethylammonium chloride having 2-22 carbon atoms is selected from the group consisting of 3-chloro-2-hydroxypropyl-lauryl-dimethylammonium chloride, 3-chloro-2-hydroxypropyl-cocoalkyl-dimethylammonium chloride, and 3-chloro-2-hydroxypropyl-stearyl-dimethylammonium chloride; and said (dialkylamino)alkyl chloride having 2-22 carbon atoms is selected from the group consisting of (4-chloroobutyl)trimethylammonium chloride, (6-chlorohexyl)-trimethylammonium chloride, and (8-chlorooctyl)trimethylammonium chloride.

Another embodiment of the present invention is the above process, wherein said acylating agent is selected from the group consisting of alkyl ketene dimers having 2 to 22 carbon atoms, alkenyl ketene dimers having 2 to 22 carbon atoms, and alkenyl succinyl anhydrides having 2 to 22 carbon atoms.

Another embodiment of the present invention is the above process, wherein said alkenyl succinyl anhydride having 2-22 carbon atoms is selected from the group consisting of octenyl succinyl anhydride, dodecenyl succinyl anhydride, and mixtures thereof.

Another embodiment of the present invention is the above process, wherein said alkyl isocyanate is selected from the group consisting of butyl isocyanate, octyl isocyanate, dodecyl isocyanate, hexadecyl isocyanate, 1-phenylethyl isocyanate, 1,1,3,3-tetramethylbutyl isocyanate, 1-adamantyl isocyanate, 1-naphthyl isocyanate, 2,2-diphenylethyl isocyanate, 2,3-dichlorophenyl isocyanate, 2,3-dimethoxyphenethyl isocyanate, 2,3-dimethylphenyl isocyanate, 2,4-dichlorobenzyl isocyanate, and mixtures thereof.

Yet another embodiment of the present invention is a composition comprising the above polymer and at least one additional compound, wherein said at least one additional compound is selected from the group consisting of contaminant control agents for pitch and stickies deposits, deposition control agents for papermaking process equipment, cleaning compounds such as felt cleanser, release aids, flocculants for water treatment, coagulants for water treatment, drainage aids for papermaking, retention aids for papermaking, sizing agents for paper products, adhesives, creping adhesives, plasticizers for optimizing resin properties, and modifiers for optimizing resin properties.

Yet another embodiment of the present invention is a paper product comprising the above polymer.

DESCRIPTION OF THE INVENTION

Disclosed herein are water soluble hydrophobically-modified cationic poly(aminoamides) useful in papermaking processes. These polymers are prepared via modification of amine-containing water-soluble poly(aminoamides) with reactive functional group-containing hydrophobic compounds. These novel polymers are effective in inhibiting deposition of organic contaminants in pulp and papermaking systems One aspect of the present invention is directed to water-soluble, hydrophobically modified, cationic poly(aminoamide) polymers useful as contaminant control agents comprising randomly distributed units of formula (I):

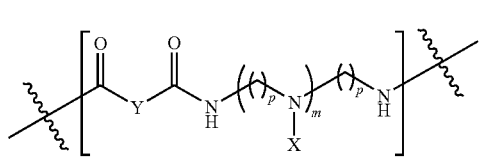

(I)

wherein X on said unit of formula (I) is a moiety selected from the group consisting of moieties of formulae (II), (III), (IV), (V), (VI), (VII), and (VIII):

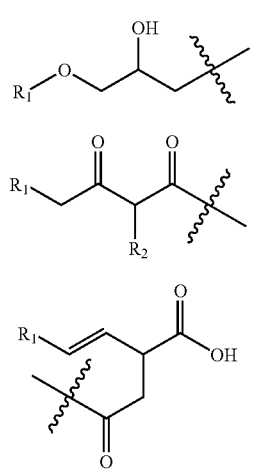

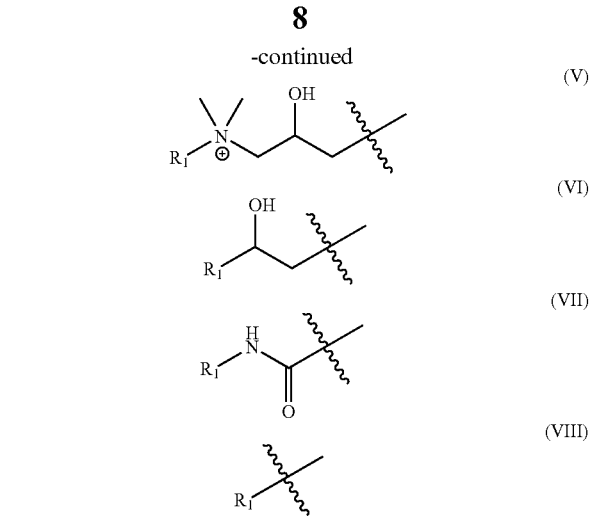

wherein $R_1$ and $R_2$, identically or differently, are a straight chain or branched aliphatic or olefinic or aromatic group having up to 22 carbon atoms and up to 4 double bonds, preferably having between 4 and 16 carbon atom; Y is a straight chain or branched aliphatic or olefinic or aromatic group having up to 20 carbon atoms and up to 8 double bonds, preferably having up to 10 carbons and up to 2 double bonds; and p and m are integers in the range of from 2 to 10. The number of randomly distributed units of formula (I) in the water-soluble, hydrophobically modified, cationic poly(aminoamide) polymer is represented by "n" and n is an integer in the range of from 5 to 10,000.

These water-soluble, hydrophobically modified, cationic poly(aminoamide) polymers can also comprise randomly distributed units of formula (I) and formula (IX):

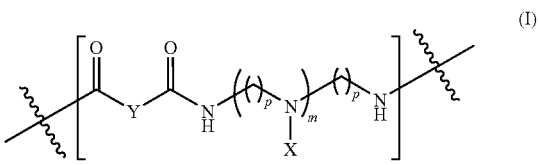

wherein X on said unit of formula (I) is a moiety selected from the group consisting of moieties of formulae (II), (III), (IV), (V), (VI), (VII), and (VIII):

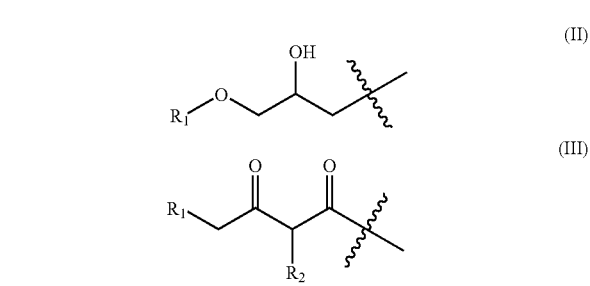

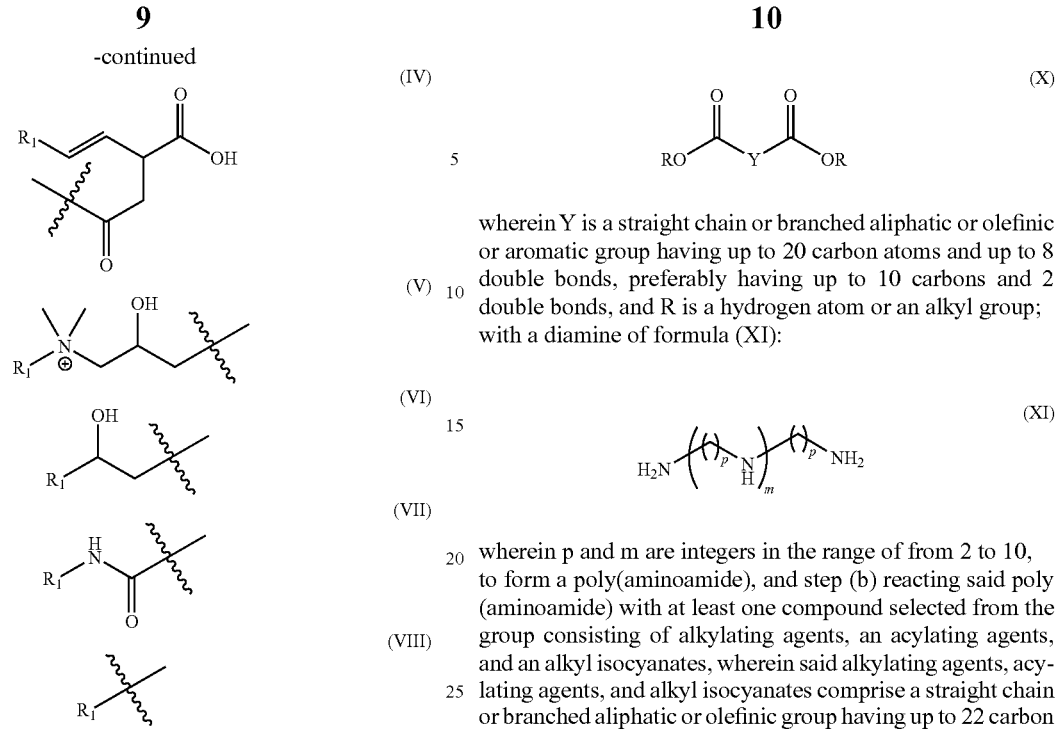

wherein $R_1$ and $R_2$, identically or differently, are a straight chain or branched aliphatic or olefinic group having up to 22 carbon atoms and up to 4 double bonds, Y is a straight chain or branched aliphatic or olefinic or aromatic group having up to 20 carbon atoms and up to 8 double bonds, preferably having up to 10 carbons and up to 2 double bonds; p and m are integers in the range of from 2 to 10. The number of randomly distributed units of formula (I) in the water-soluble, hydrophobically modified, cationic poly(aminoamide) polymer is represented by "n", which is an integer in the range of from 5 to 10,000. The number of randomly distributed units of formula (IX) in the water-soluble, hydrophobically modified, cationic poly(aminoamide) polymer is represented by "r", which is an integer in the range of from 5 to 10,000. The ratio of r:n is in the range of from 1:10 to 1000:1.

Preferably, Y is a straight chain $C_4$ alkyl group, p is 2, m is 1, the sum of n and r is in the range from 50 to 5000, and the ratio of r:n is in the range from 10:1 to 100:1. More preferably, Y is a straight chain $C_4$ alkyl group, p is 2, m is 1, the sum of n and r is in the range from 50 to 5000, and the ratio of r:n is in the range from 10:1 to 100:1, and every X in the polymer of the present invention is a moiety of Formulae (II), (III), (IV), or (V).

Preferably, the polymers of the present invention have a molecular weight of from about 400 Daltons to about 1,000,000 Daltons; more preferably from about 1,000 Daltons to about 500,000 Daltons, and most preferably from about 3,000 Daltons to 300,000 Daltons.

The hydrophobically-modified cationic polymers of the present invention are water soluble and surface-active, unreactive with cellulose, and lack a thermosetting property. These polymers are also effective in controlling pitch and stickies in paper manufacturing processes.

Another aspect of the present invention is directed to a process for preparing the water soluble polymers of the present invention. This process comprises (a) reacting a diacid or a diester of formula (X):

wherein Y is a straight chain or branched aliphatic or olefinic or aromatic group having up to 20 carbon atoms and up to 8 double bonds, preferably having up to 10 carbons and 2 double bonds, and R is a hydrogen atom or an alkyl group; with a diamine of formula (XI):

wherein p and m are integers in the range of from 2 to 10, to form a poly(aminoamide), and step (b) reacting said poly(aminoamide) with at least one compound selected from the group consisting of alkylating agents, an acylating agents, and an alkyl isocyanates, wherein said alkylating agents, acylating agents, and alkyl isocyanates comprise a straight chain or branched aliphatic or olefinic group having up to 22 carbon atoms, up to 4 double bonds, and an amine-reactive functional group.

The poly(aminoamide) of step (a) is reacted with the compound in step (b) such that the hydrophobic loading (amount of amine modified on the polymer) of the resulting polymer is less than 20 mole percent, preferably less than 15 mole percent, more preferably about 12.5 mol or less based on the amount of amine in the polyamidoamine of step (a).

More than one alkylating agents, acylating agents, or alkyl isocyanates can be used in the process of the present invention. When more than one alkylating agents, acylating agents, or alkyl isocyanates is used, the resulting polymer can have multiple independent X moieties of formula (I) within the polymer. Polymers containing combinations of independent formula (I) having independent X moieties selected from the group consisting of moieties of formulae (II), (III), (IV), (V), (VI), (VII), and (VIII) are contemplated in this invention. For way of example, a poly(amidoamine) polymer can be modified according to the present invention such that the resulting polymer comprises structures of formula (I) wherein a first portion of the X moieties are any of formulae (II), (III), (IV), (V), (VI), (VII), and (VIII) and a second portion of the X moieties are independently any of formulae (II), (III), (IV), (V), (VI), (VII), and (VIII).

Examples of the diacids of formula (X) include, but are not limited to, adipic acid, glutaric acid, succinic acid, azelaic acid, sebacic acid, maleic acid, fumaric acid, itaconic acid, and oxalic acid. Examples of diesters of formula (X) include, but are not limited to, dimethyladipate, dimethylsebacate, dimethylitaconate, dimethylazelate, dimethyloxalate, and dimethylglutarate. Examples of diamines of formula (XI) include, but are not limited to, diethylene triamine, dipropylene triamine, 1,6-hexamethylenediamine, triethylene tetraamine, tetraethylene pentaamine, bis(hexamethylene triamine), tripropylene tetraamine, tetrapropylene pentaamine. Such polymers have a high density of secondary amine in the polymer backbone suitable for alkylation or acylation.

Optionally, the poly(aminoamides) of step (a) can be crosslinked prior to the hydrophobic modification of step (b). Or, optionally the poly(aminoamides) of step (a) can be crosslinked after hydrophobic modification of step (b). Any known crosslinkers can be used. Preferably the crosslinker is glyoxal or an epihalohydrin such as epichlorohydrin. When crosslinker is used, it is added in an amount of less than 5 mol percent based on amine in the poly(aminoamide), preferable less than 2 mol percent cross linker is used. The resulting crosslinked poly(aminoamide) must be water soluble.

Preferably, adipic acid and diethylene triamine are used to prepare the poly(aminoamide) of the present invention.

Alkylating agents that may be used in the above process include, but are not limited to, alkyl glycidyl ethers having 2 to 22 carbon atoms, alkylene oxides having 2 to 22 carbon atoms, alkyl halides having 2 to 22 carbon atoms, 3-chloro-2-hydroxypropyl-alkyl-dimethylammonium chlorides having 2 to 22 carbon atoms, and (dialkylamino)alkyl chlorides having 2 to 22 carbon atoms.

Alkyl glycidyl ethers that may be used in the above process include, but are not limited to butyl glycidyl ether, octyl glycidyl ether, 2-ethylhexyl glycidyl ether, decyl glycidyl ether, dodecyl glycidyl ether, tetradecyl glycidyl ether, hexadecyl glycidyl ether, and octadecyl glycidyl ether. Alkylene oxides that may be used in the above process include, but are not limited to, propylene oxide, dibutyl-ethylene oxide, butylene oxide, octylene oxide, butadiene monoxide, cyclohexane epoxide, and hexyl-ethylene oxide. Alkyl halides that may be used in the above process include, but are not limited to, ethyl chloride, propyl chloride, butyl chloride, octyl chloride, dodecyl chloride, hexadecyl chloride, benzyl chloride, phenylethyl chloride. 3-chloro-2-hydroxypropyl-alkyl-dimethylammonium chlorides that may be used in the above process include, but are not limited to, 3-chloro-2-hydroxypropyl-lauryl-dimethylammonium chloride, 3-chloro-2-hydroxypropyl-cocoalkyl-dimethylammonium chloride, and 3-chloro-2-hydroxypropyl-stearyl-dimethylammonium chloride. (Dialkylamino)alkyl chlorides that may be used in the above process include, but are not limited to, (4-chloroobutyl)trimethylammonium chloride, (6-chlorohexyl)-trimethylammonium chloride, (8-chlorooctyl)trimethylammonium chloride.

Acylating agents that may be used in the above process include, but are not limited to, alkyl ketene dimers having 2-22 carbon atoms, alkenyl ketene dimers having 2-22 carbon atoms, and alkenyl succinyl anhydrides having 2-22 carbon atoms. Alkenyl succinyl anhydrides that may be used in the above process include, but are not limited to octenyl succinyl anhydride and dodecenyl succinyl anhydride.

Alkyl isocyanates that may be used in the above process have from 2-22 carbon atoms. Examples include, but are not limited to, butyl isocyanate, octyl isocyanate, dodecyl isocyanate, hexadecyl isocyanate, phenyl isocyanate, benzyl isocyanate, and cyclohexyl isocyanate.

Preferably, the poly(aminoamide) of step (a) is prepared by the condensation polymerization of diamines, such as diethylene triamine (DETA), triethylene tetraamine (TETA), or tetraethylene pentamine (TEPA) with an aliphatic diacid or diester, such as adipic acid, succinic acid, or dimethyl malonate. Hydrophobic functional groups are then attached onto the secondary amines of the poly(aminoamide) via alkylation or acylation in an amount in the range of from 1 to 20 mole %, preferably 5 to 15 mol. percent, based on the moles of amine used in step (a) to prepare the poly(aminoamide).

Preferably, the poly(aminoamide) of step (a) is prepared using adipic acid and DETA.

Preferably, the poly(aminoamide) is modified with alkyl glycidyl ether, alkyl ketene dimer (AKD), alkyl succinyl anhydride (ASA), or 3-chloro-2-hydroxypropyl-N,N,N-dimethylalkyl ammonium chloride (Quat 188). The modification with hydrophobic functional groups optionally may be conducted during or after the condensation polymerization.

Preferably, an alkyl glycidyl ether having an alkyl chain length of from 4 to 18 carbon atoms, more preferably from 8 to 12 carbon atoms, is used as an alkylating agent in the above process. The alkyl glycidyl ether is preferably added in an amount of from about 1 to about 20 mole %, preferably from about 2 to about 15 mole %, most preferably from about 5 to about 10 mole %, of based on the amine content of the polymer formed in step (a). Alkyl glycidyl ethers react with the secondary amine of poly(aminoamides) to form stable N—C linkages via a ring-opening reaction of the epoxide. Under anhydrous conditions, the rate of reaction depends on reaction temperature. The temperature of the reaction is preferably between about 70° C. and about 180° C., more preferably between about 100° C. and about 150° C., and most preferably between about 120° C. and about 140° C. Reaction time is preferably from about 0.1 to about 8 hours, more preferably from about 0.5 to about 5 hours, and most preferably from about 1 to about 3 hours.

The alkylation reaction may be carried out in water. The poly(aminoamide) is dissolved in water in an amount in the range of from about 5 to 50 weight %, preferably in an amount in the range of from about 10 to 40 weight %, and most preferably in an amount in the range of from about 20 to 30 weight % based on the total weight of the poly(aminoamide)/water solution. Alkyl glycidyl ether is added in an amount in the range of from about 0.5 to 20 mole % based on the amine content, preferably in an amount in the range of from about 1 to 15 mole %, and most preferably in an amount in the range of from about 2 to 8 mole %. The reaction temperature is between about 22° C. and 80° C., preferably between about 30° C. and 60° C., and most preferably at about 35° C.-50° C. The time to complete the reaction is from about 0.1 to 8 hours, preferably from about 0.5 to 5 hours, and most preferably from about 1-3 hours.

Preferably, the poly(aminoamide) is modified with a 2-alkenyl-1-succinic anhydride with an alkenyl chain length of 8 and 18 carbon atoms. To prepare this preferred embodiment, the poly(aminoamide) is dissolved in water in an amount in the range of from 1 to 50 weight % of the poly(aminoamide)/water solution, preferably in the range of from 5 to 30 weight %, most preferably in the amount of about 15 weight %, and the 2-alkenyl-1-succinic anhydride is added in an amount in the range of about 1 to 20 weight %, preferably in the range of about 2 to 10 weight %, most preferably in an amount of 3 to 5 weight %, based on the dry basis weight of the poly(aminoamide). The time to complete the reaction ranges from about 0.1 to about 48 hours, preferably from about 2 to about 24 hours, and most preferably about 2 to 8 hours. The temperature of the reaction ranges from about 5° C. to about 100° C., preferably from about 20° C. to about 80° C., and most preferably at about 40° C. to about 60° C. The 2-alkenyl-1-succinic anhydride reacts with the secondary amine of the poly(aminoamide) to form an amide via a ring-opening reaction of the succinic anhydride and the creation of a carboxyl group. The rate of reaction depends on reaction pH. The pH of this reaction is preferably in the range of from about 5 to about 12; more preferably in the range of from about 7 to about 10, and most preferably in the range of from about 9 to about 10. Moieties containing amine-reactive functional groups such as ketene dimer, isocyanate, or epoxides may also be appended to the secondary amines of the poly(aminoamide) under the same or similar reaction conditions. For example, alkyl ketene dimer may be added to poly(aminoamide) at a pH in the range of from about 9 to about 11. The reaction forms beta-ketone amide when water is the reaction medium. Alkyl ketene dimer may also be used in the absence of water if reacted at a higher temperature, preferably in the range of about 120 to about 160° C.

The polymer of the present invention may be obtained as a solid or it can be formulated in water. To prepare an aqueous solution of the product, the material is dissolved in water and neutralized with an aqueous acidic solution, such as hydrochloric, sulfuric, or phosphoric acid, to obtain a pH in the range of from about 3 to 12; more preferably in the range of from about 4 to 9; and most preferably in the range of from about 6 to 8. The polymer of the present invention is cationic in nature at a pH below 12. The product can be formulated as an aqueous suspension having 20% to 40% total solids and a Brookfield viscosity of about 20 cP to about 3000 cP. The product is stable at 50° C. for at least 30 days meaning they have less than 5% viscosity decrease over the 30 days.

The polymers of the present invention may be used at any stage of the pulp or papermaking process. The products may be added to the pulp or papermaking process as a solution, a powder, a slurry, or in a dispersed state blended with other additives. The solution products may be added to the pulp furnish directly or sprayed on wires, felts, press rolls, or any other pieces of pulp or papermaking machinery likely to be contaminated with deposits. Water is the preferable solvent, but other media or delivery systems may be also used. In general, to control organic deposits in the pulp or papermaking process dosages, the polymers of the present invention can be used in concentrations in the range of from about 1 to 10,000 ppm based on the dry weight of the products to the dry weight of the pulp, preferably from about 5 to 1000 ppm, and more preferably from about 10 to 100 ppm. However, the effective dosage of polymer varies with different pulp and papermaking systems, pulp types, other added chemicals, pH, temperature, and the nature and amount of organic materials in the system.

The polymers of the present invention may be used in combination with other compounds to improve its properties. The compounds that may be used are cationic, anionic, amphoteric, a nonionic synthetic compound, or a natural polymer. Examples of compounds suitable for use with the modified poly(aminoamides) of the present invention include, but are not limited to, contaminant control agents for pitch and stickies deposits; deposition control agents for papermaking process equipment; flocculants for water treatment; coagulants for water treatment; drainage aids for papermaking; retention aids for papermaking; sizing agent for paper products; adhesives; creping adhesives; plasticizers for optimizing resin properties; and modifiers for optimizing resin properties, including, but not limited to thickeners and viscosifiers having rheologies formulated for the coatings, construction, oilfield, ceramics, pharmaceuticals and personal care industries.

The compositions of the present invention may be compatible with other pulp and papermaking additives or mixtures thereof. These can include, but are not limited to, starches; fillers such as titanium dioxide; defoamers; wet and dry strength resins; cationic polymers; anionic polymers; sizing aids; and enzymes such as, but not limited to, proteases, amylases, pullulanases, lipases, hemicellulases, endoglucanases, cutinases, and pectinases.

For example, the polymers of the present invention may be used together with anionic or nonionic surfactants to improve contaminant control efficiency. Individual compositions or any combination of different compositions may be applied together with the polymers of the present invention, or may be applied sequentially before or after the application of the polymers of the present invention. Individual compositions may be blended together with the polymers of the present invention to form a blended composition prior to use. In addition, the alkyl glycidyl ether modified polymers of the present invention are effective in pitch and stickies control and exhibit fixative properties.

The polymers of the present invention are cationic in nature and possess the ability to interact with anionic contaminants and cellulose fibers.

The polymers of the present invention were evaluated as deposit and stickies control agents and several of the preferred polymers are effective in controlling both stickies and pitch. Three methods were used for the evaluations. Pitch deposition testing (PDT) determines the ability of the polymers to inhibit pitch deposition. PDT utilizes a coupon made of polypropylene film as the depositing surface. The coupon is submerged in a 0.5% bleached hardwood pulp solution containing synthetic dispersed pitch. The dispersed pitch is a mixture of tall oil pitch, distilled tall oil and abietic acid as a resin acid. After 60 minutes of immersion, the coupons are triple rinsed with deionized water and dried. The deposition of pitch on the coupon is determined by collecting eight absorbance readings at 210 nm using a spectrophotometer and averaging these values. In every test, a control sample (no treatment) is run for comparison. The hydrophobically modified polymers are run at a treatment level of 2 ppm. The performance is expressed as percentage reduction of the absorbance from the pitch deposit over the control. The dosages of materials are based on active solids in the formulations of the compositions and the benchmark product.

Stickies deposition testing (CIA) is used to determine the ability of the polymers to inhibit stickies deposition in a mixed pulp that is 25% recycled pulp (Sorted Office Waste) and 75% bleached hardwood Kraft pulp. The test utilizes a coupon made of 3M adhesive tape as the depositing surface. The coupon was submerged in the pulp solution for a period of one (1) hour. The slides were removed from the heated slurry, rinsed with cold water, and then air dried in a dust free environment. Each slide was then scanned utilizing a Nikon CoolScan V ED (Nikon USA, San Diego, Calif., USA). The performance of the polymer is expressed as a percentage reduction of the stickies deposit over the control. The polymer dose is calculated based on the active polymer in the formulations.

Verity IA (Verity IA, LLC., Oshkosh, Wis., USA) image analysis software was used to count and size the particles on the coupons. Two qualifiers were used to eliminate particles. Any particles with an area less than 0.001 sq. mm or greater than 1.2 sq. mm and any particles with a circularity greater than 60, as defined by Equation 1, were removed from the collection. These qualifiers eliminated most of the residual cellulose fibers. Three areas of interest (AOI) were selected from within the 36×24 mm substrate and analyzed for particles within the defined parameters. Within each area the percent area occupied by the deposited particles was calculated and an average percent area between the three AOIs was recorded, along with the standard deviation between the three measurements.

$$cicularity = \frac{[circumference]^2}{area} \quad \text{(Equation 1)}$$

To evaluate the fixative properties of the polymer, a mixture of 25% recycled pulp (Sorted Office Waste) and 75% bleached hardwood Kraft pulp, based on dry pulp was used. The mixture was diluted to 0.5% consistency and stirred in a beaker at 50° C. The polymer was added to the pulp slurry and mixed for at least 10 minutes. The contents of the beaker were poured into a Britt jar with a 125 µm screen. The filtrate was collected and centrifuged. The sediment of the centrifuged filtrate was harvested, dried, and extracted with solvent. Ten (10) grams of dichloromethane was added to the dried sediment and mixed for 10 hours. The solvent extract was filtered with a 0.45 µm Teflon syringe filter. The filtered extract was measured spectrophotometrically and the intensity of the absorbance at 260 nm was recorded to calculate the amount of stickies in the filtrate.

The hydrophobic poly(aminoamides) of the present invention display improved detackification, and pitch and stickies control. The results of the initial evaluations based on the PDT indicate that the composition showed better pitch control efficacy than DeTac® DC 3970 (Hercules Incorporated, Wilmington, Del.). The CIA shows a substantial reduction in the deposition of stickies onto a tacky substrate, especially as the amount of the hydrophobic substitution on the poly(aminoamide) is increased. A test that measures the fixation of stickies on wood fibers also shows that by treating a recycle feed with the polymer shows that the number of stickies in the white water is significantly reduced. Unmodified poly(aminoamides) display little effectiveness in reducing stickies (CIA) and pitch (PDT). The heat treated product (after a stability test) is as effective as a fresh sample in pitch reduction performance.

The embodiments of the invention are defined in the following Examples. These Examples are illustrations only. Thus, various modifications of the present invention in addition to those shown and described herein will be apparent to those skilled in the art from the foregoing description. Although the invention has been described with reference to particular means, materials, and embodiments, it is to be understood that the invention is not limited to the particulars disclosed, and extends to all equivalents within the scope of the appended claims. In the following Examples, all parts and percentages are by weight, unless otherwise indicated.

EXAMPLES

The Brookfield viscosity (BV) was measured using a DV-II Viscometer (Brookfield Viscosity Lab, Middleboro, Mass.). A selected spindle (number 27) was attached to the instrument, which was set to 30 RPM. The reaction solution was prepared at a certain solid content. The Brookfield viscosity spindle was inserted into the solution so as not to trap any air bubbles and then rotated at the above-mentioned speed for 3 minutes at 24° C. The units are measured in centipoises (cP).

Size exclusion chromatographic (SEC) analysis was performed using a Shodex KW-804 Protein column with the column temperature set at 40° C. The mobile phase contained 70% methanol and 30% water with lithium salt set at a pH of 4.8. The sample was dissolved at a concentration of 1.5 mg/mL in the mobile phase and injected into the machine. The flow rate was set at 1.0 mL per minute. Poly(ethylene glycol) samples of different molecular weights were used as standards.

Example 1

Alkyl Glycidyl Ether (C12) Modified Poly(Aminoamides)

Diethylene triamine (103.7 g, 1.005 mole) was charged to a reaction flask equipped with a mechanical agitator, thermocouple, reflux condenser linked with a Dean Stark trap, nitrogen inlet, and addition ports. The reagent was heated at 70° C. and adipic acid (176.1 g, 1.0 mole) was charged to the reaction flask and the contents were mixed for 3 hours at 170° C. Water produced during the condensation polymerization was collected by the Dean Stark trap. The contents were cooled to 130° C. and $C_{1-2}$ alkyl glycidyl ether (Epodil® 748, Air Products and Chemicals, Inc., Allentown, Pa., 25.8 g, 10 mole % based on the moles of amine used) was charged over 5 minutes. The resulting mixture was stirred at 130° C. for 2 hours. After reaction, the materials were diluted in water, the pH adjusted with 20 wt % aqueous HCl, and mixed until homogenous to yield a 20 wt % solids solution with a pH of 7.0. The Brookfield viscosity of the resulting solution was measured and found to be 2350 cPs.

Examples 2 Through 4

Examples 2, 3 and 4 were prepared as described in Example 1 except varying amounts of $C_{1-2}$ alkyl glycidyl ether (Epodil® 748, Air Products and Chemicals, Inc., Allentown, Pa.), 12.9 g (5 mole % based on the moles of amine used), 32.3 g (12.5 mole % based on the moles of amine used) and 38.7 g (15 mole % based on the moles of amine used), were used in the synthesis, respectively Example 5

Alkyl Glycidyl Ether ($C_8$-$C_{10}$) Modified Poly(Aminoamides)

Diethylene triamine (103.7 g, 1.005 mole) was charged to a reaction flask equipped with a mechanical agitator, thermocouple, reflux condenser linked with a Dean Stark trap, nitrogen inlet, and addition ports. The reagent was heated at 70° C.

and adipic acid (176.1 g, 1.0 mole) was charged to the reaction flask and the contents were mixed for 4 hours at 180° C. Water produced during the condensation polymerization was collected by the Dean Stark trap. The contents were cooled to 130° C. and C9 alkyl glycidyl ether (Epodil® 747, Air Products and Chemicals, Inc., Allentown, Pa., 25.8 g, 21.6 g, 10 mole % based on the moles of amine used) was charged in 5 minutes. The resulting mixture was stirred at 130° C. for 2 hours. After reaction, the materials were diluted in water, the pH was adjusted with concentrated $H_2SO_4$, and was mixed until homogenous to yield a 35 wt % solids solution with a pH of 7.0. The Brookfield viscosity of the resulting solution was measured and found to be 1600 cPs.

Example 6

Alkyl Ketene Dimer (C16) Modified Crosslinked Poly(Aminoamides)

EPI-crosslinked poly(aminoamide) (Prosoft® TC9700, 15%, Hercules Incorporated, Wilmington, Del., 500 g) was charged to a reaction flask equipped with a mechanical agitator, thermocouple, and addition ports. The pH of the solution was adjusted 10.0 using 25% NaOH. AKD (Aquapel® 364, Hercules Incorporated, Wilmington, Del., 2.4 g) was charged in 10 minutes with stirring. The reaction mixture was stirred at 70° C. for 3 hours at pH 10.0, and then cooled to 30-35° C. The contents were diluted in water and the pH adjusted with 20 wt % aqueous HCl, and mixed until homogenous to yield an 18 wt % solids solution with a pH of 7.0. The Brookfield viscosity of the resulting solution was measured and found to be 30 cPs.

Example 7

Alkyl Succinic Anhydride-Modified Crosslinked Poly(Aminoamides)

EPI-crosslinked poly(aminoamide) (Prosoft® TC9700, 15%, Hercules Incorporated, Wilmington, Del., 500 g) was charged to a reaction flask equipped with a mechanical agitator, thermocouple, and addition ports. The pH of the solution was adjusted to 9.0 using 25% NaOH. Alkenyl succinic anhydride (ASA) (Precise 797, Hercules Incorporated, Wilmington, Del., 2.25 g) was charged over 10 minutes with stirring. The reaction mixture was stirred at 24° C. for 6 hours at pH 9.0, and then cooled to 30-35° C. The content was diluted in water with the pH was adjusted with 20 wt % aqueous HCl, and mixed until homogenous to yield an 18 wt % solids solution with a pH of 7.0. The Brookfield viscosity of the resulting solution was measured and found to be 55 cPs.

Examples 8 and 9

Examples 8 to 9 were prepared as described in Example 7 except 2-octenyl succinic anhydride (Dixie Chemical Company, Inc., Pasadena, Tex., 100%, 3.38 g) and dodecenyl succinic anhydride (Dixie Chemical Company, Inc., Pasadena, Tex., 100%, 1.8 g) were used, respectively, in the synthesis.

Example 10

Alkyl (C14/C12) Glycidyl Ether-Modified Crosslinked Poly(Aminoamide)

EPI-crosslinked poly(aminoamide) (Prosoft® TC9700, 15%, Hercules Incorporated, Wilmington, Del., 100 g) was charged to a reaction flask equipped with a mechanical agitator, thermocouple, and addition ports. The pH of the solution was adjusted to 11.0 using 25% NaOH, C12-Alkyl glycidyl ether (Epodil® 748, Air Products and Chemicals, Inc., Allentown, Pa., 0.45 g) was charged over 3 minutes. The reaction mixture was stirred at 45° C. for 3 hours at a pH of 9.0, and then cooled to 30-35° C. The contents were diluted in water and the pH was adjusted with 15 wt % aqueous HCl, and mixed until homogenous to yield an 18 wt % solids solution with a pH of 8.0. The Brookfield viscosity of the resulting solution was measured and found to be 85 cPs.

Example 11

Crosslinked and Quab® 426-Modified Poly(Aminoamide)

A poly(aminoamide) (Hercules Incorporated, Wilmington, Del., Polymer 567, 50%, 12.5 g) and water (12.5 g) was charged to a reaction flask equipped with a mechanical agitator, thermocouple, and addition ports. The pH of the solution was adjusted to 11.5 using 25% NaOH. 3-Chloro-2-hydroxypropyl alkyl dimethylammonium chloride (Quab® 426, Degussa, 40%, 1.15 g) was charged over 3 minutes. The reaction mixture was stirred at 40° C. for 3 hours at a pH of about 11.0 to about 11.5. After 3 hours, epichlorohydrin (0.4 g) was charged at a pH of 9.5, and the contents were stirred at 40° C. for 1 hour. The pH was lowered to 7.5 using 20% HCl and the residual epichlorohydrin was destroyed by heating up the solution to 70° C. for 30 minutes. The product obtained was 11 wt % total solids with a Brookfield viscosity at 120 cPs.

Example 12

Cetyl Bromide Modified Poly(Aminoamides)

Diethylene triamine (154.8 g, 1.5 mole) was charged to a reaction flask equipped with a mechanical agitator, thermocouple, reflux condenser linked with a Dean Stark trap, nitrogen inlet, and addition ports. The reagent was heated at 70° C. and adipic acid (221.3 g, 1.51 mole) was charged to the reaction flask and the contents were mixed for 4 hours at 180° C. Water produced during the condensation polymerization was collected by the Dean Stark trap. The contents were cooled to 140° C. and cetyl bromide (Aldrich, 22.9 g, 0.075 mole, 5 mole % based on the moles of amine used) was charged over 20 minutes. The resulting mixture was stirred at 130° C. for 90 minutes. After reaction, the materials were diluted in water, the pH adjusted with concentrated $H_2SO_4$, and mixed until homogenous to yield a 30 wt % solids solution with a pH of 7.0. The Brookfield viscosity of the resulting solution was measured and found to be 2150 cPs.

Example 13

1-Chloroteradecane Modified Poly(Aminoamides)

Diethylene triamine (154.8 g, 1.5 mole) was charged to a reaction flask equipped with a mechanical agitator, thermocouple, reflux condenser linked with a Dean Stark trap, nitrogen inlet, and addition ports. The reagent was heated at 70° C. and adipic acid (221.3 g, 1.51 mole) was charged to the reaction flask and the contents were mixed for 4 hours at 180° C. Water produced during the condensation polymerization was collected by the Dean Stark trap. The contents were cooled to 140° C. and 1-chloroteradecane (Aldrich, 34.9 g, 0.15 mole, 10 mole % based on the moles of amine used) was charged over 30 minutes. The resulting mixture was stirred at 130° C. for 90 minutes. After reaction, the materials were diluted in water, the pH adjusted with concentrated $H_2SO_4$, and mixed until homogenous to yield a 20 wt % solids solution with a pH of 7.0. The Brookfield viscosity of the resulting solution was measured and found to be 5700 cPs.

Example 14

1,2-Epoxydodecane Modified Poly(Aminoamides)

Diethylene triamine (154.8 g, 1.5 mole) was charged to a reaction flask equipped with a mechanical agitator, thermocouple, reflux condenser linked with a Dean Stark trap, nitrogen inlet, and addition ports. The reagent was heated at 70° C. and adipic acid (221.3 g, 1.51 mole) was charged to the reaction flask and the contents were mixed for 4 hours at 180° C. Water produced during the condensation polymerization was collected by the Dean Stark trap. The contents were cooled to 140° C. and 1,2-epoxydodecane (Aldrich, 27.6 g, 0.15 mole, 10 mole % based on the moles of amine used) was charged over 30 minutes. The resulting mixture was stirred at 130° C. for 1 hr. After reaction, the materials were diluted in water, the pH adjusted with concentrated $H_2SO_4$, and mixed until homogenous to yield a 30 wt % solids solution with a pH of 7.0. The Brookfield viscosity of the resulting solution was measured and found to be 2140 cPs.

Example 15

Styrene Oxide Modified Poly(Aminoamides)

Diethylene triamine (154.8 g, 1.5 mole) was charged to a reaction flask equipped with a mechanical agitator, thermocouple, reflux condenser linked with a Dean Stark trap, nitrogen inlet, and addition ports. The reagent was heated at 70° C. and adipic acid (221.3 g, 1.51 mole) was charged to the reaction flask and the contents were mixed for 4 hours at 180° C. Water produced during the condensation polymerization was collected by the Dean Stark trap. The contents were cooled to 140° C. and styrene oxide (Aldrich, 18 g, 0.15 mole, 10 mole % based on the moles of amine used) was charged over 10 minutes. The resulting mixture was stirred at 130° C. for 1 hr. After reaction, the materials were diluted in water, the pH adjusted with concentrated $H_2SO_4$, and mixed until homogenous to yield a 40 wt % solids solution with a pH of 7.0. The Brookfield viscosity of the resulting solution was measured and found to be 172 cPs.

Example 16

Crosslinked and Styrene Oxide Modified Poly(Aminoamides)

Diethylene triamine (154.8 g, 1.5 mole) was charged to a reaction flask equipped with a mechanical agitator, thermocouple, reflux condenser linked with a Dean Stark trap, nitrogen inlet, and addition ports. The reagent was heated at 70° C. and adipic acid (221.3 g, 1.51 mole) was charged to the reaction flask and the contents were mixed for 4 hours at 180° C. Water produced during the condensation polymerization was collected by the Dean Stark trap. The contents were cooled to 140° C. and styrene oxide (Aldrich, 36.1 g, 0.3 mole, 20 mole % based on the moles of amine used) was charged over 10 minutes. The resulting mixture was stirred at 130° C. for 2 hrs. After reaction, the materials were diluted with 500 g water. Epichlorohydrin (14.0 g, 0.15 mole) was charged and the contents were stirred at 40° C. for 1 hour. The pH adjusted with concentrated $H_2SO_4$, and mixed until homogenous to yield a 15 wt % solids solution with a pH of 7.0. The Brookfield viscosity of the resulting solution was measured and found to be 200 cPs.

Example 17

C18 Alkyl Isocyanate Modified Poly(Aminoamides)

Diethylene triamine (154.8 g, 1.5 mole) was charged to a reaction flask equipped with a mechanical agitator, thermocouple, reflux condenser linked with a Dean Stark trap, nitrogen inlet, and addition ports. The reagent was heated at 70° C. and adipic acid (221.3 g, 1.51 mole) was charged to the reaction flask and the contents were mixed for 4 hours at 180° C. Water produced during the condensation polymerization was collected by the Dean Stark trap. The contents were cooled to 150° C. and $C_{1-8}$ alkyl isocyanate (Aldrich, 18 g, 3 mole % based on the moles of amine used) was charged over 10 minutes. The resulting mixture was stirred at 150° C. for 90 minutes. After reaction, the materials were diluted in water, the pH adjusted with concentrated $H_2SO_4$, and mixed until homogenous to yield a 25 wt % solids solution with a pH of 7.0. The Brookfield viscosity of the resulting solution was measured and found to be 500 cPs.

Example 18

2-Ethylhexy Glycidyl Ether (C8) Modified Poly(Aminoamides)

Diethylene triamine (103.7 g, 1.005 mole) was charged to a reaction flask equipped with a mechanical agitator, thermocouple, reflux condenser linked with a Dean Stark trap, nitrogen inlet, and addition ports. The reagent was heated at 70° C. and adipic acid (176.1 g, 1.0 mole) was charged to the reaction flask and the contents were mixed for 4 hours at 180° C. Water produced during the condensation polymerization was collected by the Dean Stark trap. The contents were cooled to 140° C. and 2-ethylhexy glycidyl ether (2-EHGE, 98%, SaChem, Austin, Tex., 20.2 g, 10 mole % based on the moles of amine used) was charged in 5 minutes. The resulting mixture was stirred at 130-140° C. for 2 hours. After reaction, the materials were diluted in water, the pH was adjusted with 20 wt % aqueous HCl, and was mixed until homogeneous to yield a 45 wt % solids solution with a pH of 7.0. The Brookfield viscosity of the resulting solution was measured and found to be 440 cPs.

Example 19

Pitch Deposition Test (PDT)

The Pitch Deposition Test (PDT) was conducted in order to establish the efficacy of the inventive compositions as deposition control agents. In this test to a 0.5% consistency bleached hardwood Kraft pulp in DI (deionized) water at 50° C. was added to 6 ml of a 25 wt % solution of calcium chloride dehydrate and 140 ml of a synthetic pitch which was preheated to 95° C. The synthetic pitch was prepared according to the following procedure: 1) add 1.25 g NaOH solid to 2 L DI water, 2) heat to 95° C., 3) add a solution of 5.03 g abietic acid (75% purity, Sigma Chemical, St. Louis, Mo., USA) and 2.22 g Sylvatol 40 (Arizona Chemical, Jacksonville, Fla., USA) dissolved in ~5 g acetone, 4) add a solution of 3 g Pamak TP (Eastman Chemical, Kingston, Tenn., USA) dissolved in ~50 g acetone, 5) strip off the acetone, 6) cool to 50° C., 7) pH adjust to 8.0 with 4N HCl, and 8) adjust the weigh to 2,000 g with DI water.

After the synthetic pitch is added, 500 ml of the test solution was transferred to an appropriate beaker and mixed with a magnetic stirrer. After equilibrating for 20 minutes, the treatment was added and two test slides—comprised of polypropylene film mounted to 35 mm film slide mounts—were suspended in the solution by a fixed holder. After mixing at 50° C. for 60 minutes the slides were removed from the solution, rinsed with DI water, then double rinsed with RT DI water, and allowed to air dry.

The reduction in pitch deposition was determined by taking the average of eight UV absorption measurements at 300 nm and comparing the reduction in absorbance relative to a control. The results of the tests are summarized in Table 1. The performance of the materials is expressed as a percentage reduction of the pitch content over the control. All PDT tests were conducted at 1.92 ppm actives.

The commercial detackifier, DeTac® DC3970 was typically evaluated at the same time as the experimental examples in each test and the PDT results are included in the parentheses of the last column following the test results of the samples for the comparison. Other commercial products for contaminant control, including DeTac® DC720D, a detackifier composed of natural material, and Zenix® DC7479, a cationic polymer, were also evaluated as benchmarks. The starting hydrophobe, $C_{1-2}$-alkyl glycidyl ether (Epodil® 748), and the unmodified poly(aminoamide), the condensation polymer of adipic acid and diethylene triamine without hydrophobe attached, were also evaluated for the comparison.

TABLE I

Pitch Reduction Efficiency (%) of Hydrophobic Poly(aminoamides)

| Samples | Cationic Polymer Backbone | Hydrophobe | Hydrophobe loading | PDT %, (PDT of DeTac ® DC3970, %) |
|---|---|---|---|---|
| Example 1 | Poly(aminoamide) | Epodil ® 748 | 10 mole % | 68 (56) |
| Example 2 | Poly(aminoamide) | Epodil ® 748 | 5 mole % | 66 (56) |
| Example 3 | Poly(aminoamide) | Epodil ® 748 | 12.5 mole % | 59 (56) |
| Example 4 | Poly(aminoamide) | Epodil ® 748 | 15 mole % | 30 (49) |
| Example 5 | Poly(aminoamide) | Epodil ® 747 | 10 mole % | 33 (35) |
| Comparative Example 1 | None | Epodil ® 748 | — | <5 (71) |
| Comparative Example 2 | Poly(aminoamide) | None | 0% | 25 (71) |
| Comparative Example 3 | DeTac ® DC720D | — | — | 19 (50) |
| Comparative Example 4 | Zenix ® DC7479 | None | 0% | <5 (65) |

As shown in Table I, the high PDT percentage indicates a cleaner substrate, i.e. less deposition. The evaluation results indicate that the alkyl glycidyl ether modified poly(aminoamide) materials in the present invention are equivalent to, or more effective than, DeTac® DC3970 in pitch reduction. The starting materials, alkyl glycidyl ethers (Epodil® 748 or 747) and unreacted poly(aminoamide), were not effective at pitch control. Two other commercial contaminant control agents, DeTac® DC720D and Zenix® DC7479, were less effective than the disclosed poly(aminoamides) in this test. Increasing hydrophobe loading resulted in reduced pitch control effectiveness.

A hydrophobically modified poly(aminoamides) prepared using alkyl ketene dimer (Aquapel® 364, Hercules Incorporated) and poly(aminoamides) as shown in Example 6 was also evaluated using DeTac® DC3970 as a benchmark. As shown in Table II, the hydrophobic cationic polymer was comparable to DeTac® DC3970 in reducing pitch. The starting material, Aquapel® 364, was ineffective in pitch control.

TABLE II

Pitch Reduction Efficiency (%) of Hydrophobic Poly(aminoamides)

| Samples | Cationic Polymer Backbone | Hydrophobe | Hydrophobe loading | PDT (PDT of DeTac ® DC3970) |
|---|---|---|---|---|
| Example 6 | Poly(aminoamide) | Aquapel ® 364 | 3 wt % | 74 (71) |
| Comparative Example 2 | Poly(aminoamide) | | | 25 (71) |
| Comparative Example 5 | None | Aquapel ® 364 | | <5 (71) |

PDT Evaluation also showed that dodecenylsuccinic anhydride modified poly(aminoamides) (Example 9) were 58% effective; DeTac® DC3970 was 62% effective in the same test; while Quab® 426 modified poly(aminoamides) (Example 11) were 66% effective and DeTac® DC3970 was 57% effective in the same test.

The hydrophobically modified poly(aminoamides) prepared using four other reactive hydrophobes were also evaluated using DeTac® DC3970 as a benchmark. Those hydrophobic cationic polymers showed comparable performance to DeTac® DC3970 in reducing pitch. The results are shown in Table III.

TABLE III

Pitch Reduction Efficiency (%) of Hydrophobic Poly(aminoamides) Derivative as compared to DeTac, DC3970

| Samples | Hydrophobe | Hydrophobe loading | % PDT Efficiency of DeTac DC3970 |
|---|---|---|---|
| Comparative Example 6 | DeTac ® DC3970 | | 100 |
| Example 12 | Cetyl Bromide | 5 mole % | 92 |
| Example 13 | 1-Chloroteradecane | 10 mole % | 81 |
| Example 14 | 1,2-Epoxydodecane | 10 mole % | 95 |
| Example 15 | Styrene Oxide | 10 mole % | 98 |

Example 20

Stickies Deposit Test (CIA)

The CIA method was used to measure stickies particulate deposition by recycled fiber. Sorted office waste (SOW) from a recycle pulp mill with a dichloromethane (DCM) extractable level of 7 g/kg, and a bleached hardwood Kraft pulp with no detectable DCM, were diluted to 0.5% consistency. The two slurries were then mixed in the ratio of 75% bleached hardwood pulp and 25% SOW and added to a beaker equipped with a magnetic stirrer and heater. The slurry mixtures were then heated to 50° C. with mixing. Two 35 mm photographic slide holders to which 3M adhesive tape 175-0 (St. Paul, Minn., USA) was mounted as the substrate were then suspended in the slurry for a period of 1 hour. The slides were mounted in such a fashion that the orientation of the substrate was parallel with the flow of the slurry. After one (1) hour, the slides were removed from the heated slurry, rinsed with cold water, and air dried in a dust free environment. Each slide was then scanned utilizing a Nikon CoolScan V ED (Nikon USA, San Diego, Calif., USA) at 4,000 DPI with the dirt elimination option disabled. For stickies reduction, the deposit number is the % area occupied by the deposited stickies.

For stickies reduction, the deposit number is the % area occupied by the deposited stickies. The lower the number, the more effective the material is in reducing stickies particulate deposition.

TABLE IV

Stickies Deposit Control Using Hydrophobic Poly(aminoamides)

| Samples | Polymer backbone | Hydrophobe | Hydrophobe loading | CIA (2 ppm) | CIA (10 ppm) |
|---|---|---|---|---|---|
| Example 1 | Poly(aminoamide) | Epodil ® 748 | 10 mole % | 0.39 | 0.076 |
| Example 2 | Poly(aminoamide) | Epodil ® 748 | 5 mole % | 0.39 | 0.177 |
| Comparative Example 2 | Poly(aminoamide) | None | 0% | 1.15 | 0.861 |
| Comparative Example 6 | DeTac ® DC3970 | Polyvinyl Acetate | 10-15% | 0.654 | 0.30 |

As shown Table IV, these two alkyl glycidyl poly(aminoamides) compositions evaluated had much lower numbers than DeTac® DC3970 at both 2 ppm and 10 ppm, indicating that they are more effective than DeTac® DC3970 in reducing pitch and stickies deposition based on this test.

Example 21

Measurement of Contaminant Fixation Property

SOW and Bleached hardwood Kraft were mixed at a 25/75 ratio, based on dry pulp. The mixture was diluted to 0.5% consistency and stirred in a beaker at 50° C. The polymer compound was added to the pulp and mixed for at least 10 minutes. The contents of the beaker were poured into a Britt jar with a 125 µm screen. The filtrate was collected and centrifuged. The sediment of the centrifuged filtrate was harvested, dried and then extracted with a solvent. Ten (10) g of dichloromethane was added to the dried sediment and mixed for 10 hours. The solvent extract was filtered with a 0.45 µm Teflon syringe filter. The filtered extract was measured spectrophotometrically and the intensity of the absorbance at 260 nm was recorded as the amount of stickies in the filtrate. The fixation data in Table V are the percent of stickies reduced in the whitewater compared with the control. A higher the percentage is desirable.

TABLE V

Stickies Fixation Efficiency (%) of Hydrophobic Poly(aminoamides)

| Examples | Polymer backbone | Hydrophobe | Hydrophobe loading | Fixation (10 ppm, %) |
|---|---|---|---|---|
| Example 1 | Poly(aminoamide) | Epodil ® 748 | 10 mole % | 67.1 |
| Example 2 | Poly(aminoamide) | Epodil ® 748 | 5 mole % | 68.0 |
| Example 5 | Poly(aminoamide) | Epodil ® 747 | 10 mole % | 44.9 |
| Comparative Example 2 | Poly(aminoamide) | None | 0% | 25 |
| Comparative Example 3 | DeTac ® DC720D | — | — | 8.0 |
| Comparative Example 4 | Zenix ® DC7479 | None | 0% | 75 |

As shown in Table V, the three alkyl glycidyl poly(aminoamides) compositions are much more effective than DeTac® DC720D and the unmodified poly(aminoamides), and comparable to Zenix® DC7479 in controlling stickies deposition.

Example 22

Measurement of Thick Stock Filtrate Turbidity of a Pulp Furnish

A 100% brown recycled furnish (180-200 ml) at 2.5-3.0% consistency was added to a Britt jar with Whatman 541 filter paper. The thick stock was stirred for 5 min at room temperature using a mechanic stirrer at 1000 rpm. The polymer compound was added to the pulp and mixed for 5 minutes. The pulp was filtered through under vacuum and 150 ml of filtrate was collected. Turbidity of the filtrate was measured with a turbidimeter. The lower the filtrate turbidity, the more effective the polymer compound is in the pitch and stickies control of the recycled pulp.

TABLE VI

Turbidity Reduction of Thick Stock by Hydrophobic Poly(aminoamides) Derivatives

| Samples | Hydrophobe | Hydrophobe loading | Turbidity (FAU) |
|---|---|---|---|
| Blank | | | 114 |
| Example 1 | Epodil ® 748 | 10 mole % | 45 |
| Example 15 | Epodil ® 747 | 10 mole % | 36 |
| Example 12 | Cetyl Bromide | 5 mole % | 34 |
| Example 13 | 1-Chloroteradecane | 10 mole % | 42 |
| Example 14 | 1,2-Epoxydodecane | 10 mole % | 43 |
| Example 15 | Styrene Oxide | 10 mole % | 41 |
| Example 16 | Styrene Oxide and EPI | 20 mole % | 25 |
| Example 17 | C18 Alkyl Isocyanate | 3 mole % | 15 |
| Example 18 | 2-Ethylhexy Glycidyl Ether | 10 mole % | 52 |
| Comparative Example 3 | DeTac ® DC720D | | 66 |
| Comparative Example 4 | Zenix ® DC7479 | | 32 |
| Comparative Example 6 | DeTac ® DC3970 | | 98 |

As shown in Table VI, hydrophobic Poly(aminoamides) derivatives prepared with various reactive hydrophobes all showed efficiency in reducing turbidity of recycled pulps, and are more effective than DeTac® DC720D and DeTac® DC3970, and comparable to Zenix® DC7479.

The invention claimed is:

1. A water-soluble, cationic polymer comprising randomly distributed units of formula (I):

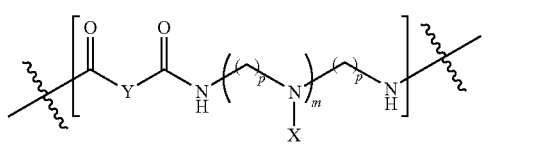

(I)

wherein X on said unit of formula (I) is a hydrophobic moiety selected from the group consisting of formula (II), (IV), (VI), (VII), and (VIII):

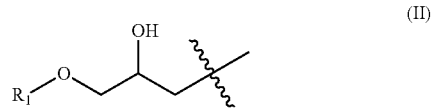

(II)

-continued

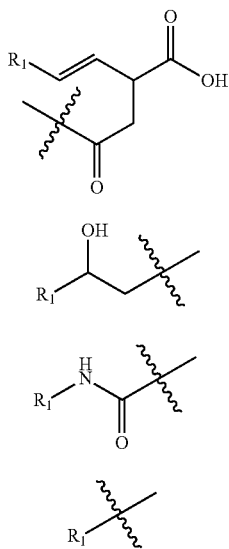

wherein
(a) $R_1$ and $R_2$, identically or differently, are a straight chain or branched aliphatic or olefinic or aromatic group having up to 22 carbon atoms and up to 4 double bonds;
(b) Y is a straight chain or branched aliphatic or olefinic or aromatic group having up to 20 carbon atoms and up to 8 double bonds; and
(c) p is an integer in the range of from 2 to 10 and m is an integer in the range of from 1 to 10.

2. A composition comprising the polymer of claim 1 and at least one additional compound, wherein said at least one additional compound is selected from the group consisting of
(a) contaminant control agents for pitch and stickies deposits;
(b) deposition control agents for papermaking process equipment;
(c) flocculants for water treatment;
(d) coagulants for water treatment;
(e) drainage aids for papermaking;
(f) retention aids for papermaking;
(g) sizing agent for paper products;
(h) adhesives;
(i) creping adhesives;
(j) plasticizers for optimizing resin properties;
(k) modifiers for optimizing resin properties
(l) cleaning aids; and
(m) release aids.

3. A water soluble, cationic polymer comprising randomly distributed units of formula (I) and formula (IX):

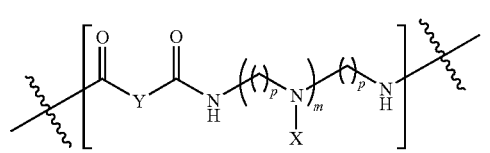

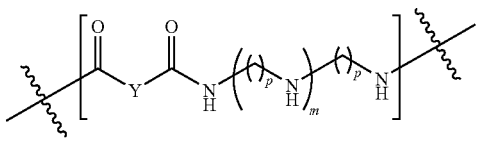

wherein
X on said unit of formula (I) is a hydrophobic moiety selected from the group consisting of formula (II), (IV), (VI), (VII), and (VIII):

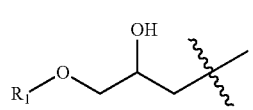

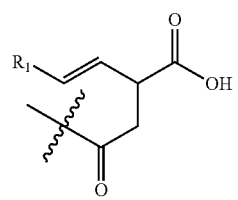

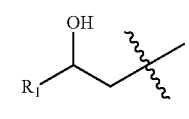

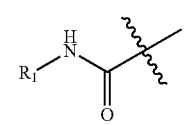

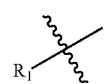

(a) wherein $R_1$ and $R_2$, identically or differently, are a straight chain or branched aliphatic or olefinic or aromatic group having up to 22 carbon atoms and up to 4 double bonds;
(b) Y is a straight chain or branched aliphatic or olefinic or aromatic group having up to 20; carbon atoms and up to 8 double bonds;
(c) p is an integers in the range of from 2 to 10 and m is an integers in the range of from 1 to 10, and
wherein n and r, the numbers of randomly distributed units of formula (I) and formula (IX) in the polymer respectively, are integers in the range of from 5 to 10,000; and the ratio of r:n is in the range from 1:10 to 1000:1.

4. The polymer of claim 3, wherein Y is a straight chain $C_4$ alkyl group, p is 2, m is 1, the sum of n and r is in the range of from 50 to 5000, and the ratio of r:n is in the range of from 10:1 to 100:1.

5. The polymer of claim 4, wherein the polymer comprises randomly distributed units of formula (I) wherein X on said units is a moiety of formula (II).

6. The polymer of claim 4, wherein the polymer comprises randomly distributed units of formula (I) wherein X on said units is a moiety of formula (IV).

7. The polymer of claim 4, wherein the polymer comprises randomly distributed units of formula (I) wherein X on said units is a moiety of formula (VI).

8. The polymer of claim 4, wherein the polymer comprises randomly distributed units of formula (I) wherein X on said units is a moiety of formula (VII).

9. The polymer of claim 4, wherein the polymer comprises randomly distributed units of formula (I) wherein X on said units is a moiety of formula (VIII).

10. The polymer of claim 4, wherein the molecular weight of said polymer is in the range of from about 1,000 to about 1,000,000 Daltons.

11. The polymer of claim 4, wherein the molecular weight of said polymer is in the range of from about 4,000 to about 500,000 Daltons.

\* \* \* \* \*